United States Patent [19]

Talbot

[11] 4,308,060

[45] Dec. 29, 1981

[54] METHOD AND COMPOSITION FOR AN IMPROVED CLEANING AND POLISHING COMPOUND HAVING A SOLID FORM

[76] Inventor: Milford C. Talbot, 17011 Pinehurst St., Huntington Beach, Calif. 92647

[21] Appl. No.: 147,995

[22] Filed: May 12, 1980

[51] Int. Cl.$^3$ .............................................. C09G 1/02
[52] U.S. Cl. ......................................... 106/9; 106/11
[58] Field of Search ..................................... 106/9, 11

[56] References Cited

U.S. PATENT DOCUMENTS 1,161,187 11/1915 Cassimus .................................. 106/9
4,064,061 12/1977 Henry ..................................... 106/8

FOREIGN PATENT DOCUMENTS 3834 5/1911 United Kingdom .

Primary Examiner—Lorenzo B. Hayes
Assistant Examiner—Amelia B. Yarbrough
Attorney, Agent, or Firm—Fischer, Tachner & Strauss

[57] ABSTRACT

An improved solid cleaning and polishing compound consisting of a mixture of non-abrasive powders and oils. A powder-like mixture of diatomaceous silica and jeweler's rouge is combined with a mixture of mineral and linseed oils. The resultant combination of mixtures is sifted (to remove undesirably sized particles) and then stored in an air-tight container for a period of time sufficient to achieve suitable curing or aging.

7 Claims, No Drawings

METHOD AND COMPOSITION FOR AN IMPROVED CLEANING AND POLISHING COMPOUND HAVING A SOLID FORM

BACKGROUND OF THE INVENTION

1. Field of the Invention

This invention relates to the composition comprising a plurality of substances and to a method for combining said substances, whereby to form a solid compound having particular application as a cleaner and polisher.

2. Description of the Prior Art

Cleaning and polishing agents are fabricated for many purposes. However, in order to adequately clean or polish a wide variety of stains and surfaces, the conventional cleaner/polish has heretofore been fabricated with several shortcomings. For example, because of the paste or liquid nature typical of conventional waxes and polishes, streaking (i.e. the leaving behind of an undesirable residue) is commonly experienced at the surface to which the conventional polish is applied and removed. Moreover, because of its liquid state, the conventional cleaner/polish is undesirably susceptable to drying out or caking when exposed to the sun or applied to a surface area for relatively long periods of time before removal. What is still more, to have the strength necessary to render it an effective cleaning agent (e.g. so as to dissolve and remove oxidation and petroleum-based stains), many conventional cleaners undesirably contain either highly abrasive (e.g. silicone), toxic (e.g. acids), or combustible (e.g. thinning agents) substances, which restrict the types of surfaces to which they may be applied.

Examples of conventional liquid and paste cleaners and polishes can be found in the following list of United States patents. Some of the constituents of the conventional polishes and cleaners that are disclosed in the following patents include: mineral oil, (boiled) linseed oil, fish oil, mineral spirits, hydrocarbon oils, and compounds of aluminum and silicon.

| | |
|---|---|
| 1,168,485 | January 18, 1916 |
| 1,358,304 | November 9, 1920 |
| 2,115,425 | April 26, 1938 |
| 2,196,992 | April 16, 1940 |
| 2,248,961 | July 15, 1941 |
| 2,471,638 | May 31, 1949 |
| 3,745,029 | July 10, 1973 |
| 3,903,082 | September 2, 1975 |
| 3,960,574 | June 1, 1976 |
| 4,181,633 | January 1, 1980 |

SUMMARY OF THE INVENTION

Briefly, and in general terms, an improved solid cleaning and polishing compound and the preferred method of manufacture thereof are disclosed. The instant compound advantageously consists of several lightly abrasive, non-toxic, and non-combustible substances, which characterize said compound as safe for application to numerous surfaces such as, for example, the exterior surface of a motor vehicle. Moreover, the solid nature of the instant cleaning and polishing compound also provides said compound with the desirable characteristics that it is easily applied to and removed from a surface to supply a reliable sealant and coating thereto that provides protection against environmental conditions (e.g. rain and sunshine), while resisting streaking, caking, and drying out during use. Hence, by virtue of the instant compound, many problems common to conventional liquid and paste cleaners and polishes are avoided.

The instant cleaning and polishing compound comprises a mixture, by weight, of approximately 60% powder-like diatomaceous silica, approximately 38% mineral oil, not more than 1% raw linseed oil, and not more than 1% jeweler's rouge. The instant compound is formed by mixing the diatomaceous silica with the jeweler's rouge. A mixture of the mineral oil and raw linseed oil is blended with the mixture of diatomaceous silica and jeweler's rouge. The resulting mixture of powders and oils is sifted, whereby to separate out and eliminate particles having an undesirable size, and then stored in an air-tight container for a period of time that is sufficient to achieve suitable aging or curing.

DESCRIPTION OF THE PREFERRED EMBODIMENT

The unique cleaning and polishing compound that is disclosed is, by way of specific example, suitable for application to the exterior surface of a motor vehicle, or the like. In accordance with the present invention, the instant polishing compound is made according to a particular method, also to be disclosed below, so as to be available for utilization in a solid (i.e. powdered) state, rather than as a liquid or paste, as is typical of conventional cleaning and polishing materials. The instant polish consists of a plurality of relatively inexpensive and readily available substances that are efficiently combined to form a solid compound characterized by minimal manufacturing costs.

More particularly, the instant cleaner and polish comprises an absorbent, mildly abrasive extender and carrier agent. By way of example, a generally soft, bulky powder-like material, such as diatomaceous silica has been found to be ideally suitable for utilization herein. Diatomaceous silica has the desirable characteristics that it absorbs grime, removes oxidation, controls wetness and acts as a surface-active agent, whereby the finally produced compound can be easily spread over the surface to be polished or cleaned.

The present polish includes a substance that promotes a lasting shine on the surface to which it is applied. Accordingly, it has been found that liquid products of petroleum having a viscosity range common to that of an oil are desirable shining agents. By way of particular example, a suitable shining agent for inclusion herein is mineral oil, which is capable of breaking down oxidation and dissolving petroleum-based stains on the surface to which it is applied.

The instant polish also includes a substance that increases durability (to resist breakdown as a result of exposure to the elements) and promotes cohesion among the constituent substances of the compound. It has been found that a slow drying oil such as raw linseed oil (i.e. untreated flaxseed oil) is suitable to achieve the aforementioned purposes. Moreover, raw linseed oil beneficially provides the present polishing compound with water repellant and sealant capabilities.

Lastly, a cleaning and polishing substance is added, whereby to enhance the appearance of the surface to which it is applied. One such cleaning and polishing substance that is suitable for use herein is jeweler's rouge. The jeweler's rouge has been found to advantageously act as an anti-static and oil-controlling agent. Moreover, the (i.e. generally red) pigmentation of the jeweler's rouge provides the instant compound with a suitable color.

The table below is included to indicate a particular example of the quantities, by weight, of each of the above-identified substances that are combined to form a solid compound which has particular application as an automobile polish and cleaner.

| SUBSTANCE | PERCENTAGE |
| --- | --- |
| Diatomaceous Silica | 60.21 |
| Mineral Oil | 38.51 |
| Raw Linseed Oil | 0.67 |
| Jeweler's Rouge | 0.61 |

The respective quantities of the aforementioned substances are combined to form the unique polish and cleaner of the present invention according to a process that is now described in detail.

In accordance with the present invention, the process by which the instant solid polishing and cleaning compound is formulated includes the following steps. First, the diatomaceous silica is mixed, in a conventional tumbler, with the jeweler's rouge powder, and the resulting powdered mixture is placed into a first container. Next, the mineral oil and raw linseed oil are also mixed (e.g. centrifugally, by means of a conventional centrifuge, or the like) in a different container, and the resulting mixture of oils is fed into the loading chamber of an injection gun. Thirdly, the initial mixing step is repeated (i.e. tumble mixing the diatomaceous silica and jeweler's rouge powder), while the mixture of oils obtained from the second step (mineral oil and raw linseed oil) is blended (i.e. sprayed from the injection gun at high pressure) with the mixture of powders from the first container. Fourthly, the resulting powder-oil mixture (of diatomaceous silica, jeweler's rouge powder, mineral oil and raw linseed oil) is sifted through a conventional No. 10 stainless steel wire mesh screen. It has been found that wire having a diameter of approximately 0.025 inches provides a resultant powder, the particle sizes of which are suitable to provide adequate area coverage of a surface to be cleaned or polished. Fifthly, and lastly, the large unsifted residue particles are discarded, and the fine, particulate material that passes through the wire mesh are again tumble mixed. After tumble mixing, the powdered compound is stored in an air-tight container for a time sufficient for it to age or cure. By way of example, it has been found that at least forty five days are preferably required to achieve suitable curing.

The presently disclosed polishing and cleaning compound is an improvement over prior art polishing materials for several reasons. The instant compound is fabricated in a powdered state, rather than as a liquid or paste wax, as are conventional polishes. Therefore, the powdered polish is easy to apply and easy to remove. Moreover, the present polish resists drying out or caking after application, if exposed to the elements or applied to a surface for long periods of time before removal. The inclusion of the oil based substances (i.e. mineral oil and raw linseed oil) act to coat, seal and protect the (automobile) surface to which it is applied without leaving any residue, thereby solving a problem typically associated with conventional polishing materials. It has also been found that by formulating a polishing and cleaning compound according to the disclosed method and composition, the oil-containing components of the compound will advantageously saturate the skin layer of many substantially non-porous materials and, after the passage of a relatively short time, will creep to the outer surface of the material when heated (e.g. by the sun), whereby to form a protective coating against environmental conditions. What is still more, the present compound has been found suitable for use on paint, chrome, stainless steel, plastic, fiberglass, and glass, so that the intended use thereof is not limited solely to motor vehicles, but may also apply to numerous other (e.g. household) surfaces, as well.

It will be apparent that while a preferred embodiment of the invention has been shown and described, various modifications and changes may be made without departing from the true spirit and scope of the invention.

Having thus set forth the preferred embodiment, what is claimed is:

1. A solid, particulate, non-toxic polishing and cleaning compound comprising a mixture of:
   about 60 percent by weight of diatomaceous silica,
   about 38 percent by weight of mineral oil,
   not more than 1 percent by weight of raw linseed oil, and
   not more than 1 percent by weight of jeweler's rouge.

2. The solid compound recited in claim 1, wherein said mixture comprises:
   60.21 percent by weight of diatomaceous silica,
   38.51 percent by weight of mineral oil,
   0.67 percent by weight of raw linseed oil, and
   0.61 percent by weight of jeweler's rouge.

3. A method for making a solid, particulate, non-toxic polishing and cleaning compound comprising the steps of:
   (a) mixing solid diatomaceous silica with jeweler's rouge powder,
   (b) mixing mineral oil with raw linseed oil, and
   (c) repeating the step of (a) while adding thereto the mixture of oils obtained by performing step (b).

4. The method recited in claim 3 including the additional step of:
   (d) storing in an air-tight container the mixture of solids and oils obtained by performing step (c) until said mixture has been cured.

5. The method recited in claim 3 including the additional steps of:
   (d) sifting the mixture of solids and oils obtained by performing step (c) and discarding the residue particles having respective sizes which do not conform to a predetermined particle size.

6. The method recited in claim 3, including the additional step of:
   spraying, under pressure, the mixture of oils obtained by performing step (b) into the mixture of solids obtained by performing step (a), whereby to accomplish step (c).

7. The method recited in claim 3, including the additional step of choosing the amounts, by weight, of the substances mentioned in steps (a) and (b) to include:
   about 60 percent diatomaceous silica,
   about 38 percent mineral oil,
   not more than 1 percent raw linseed oil, and
   not more than 1 percent jeweler's rouge.

* * * * *